United States Patent [19]

Bergler

[11] Patent Number: 4,603,479
[45] Date of Patent: Aug. 5, 1986

[54] GUIDE MEANS FOR MANUAL PLANING TOOLS

[75] Inventor: Otto Bergler, Mühlacker-Lomersheim, Fed. Rep. of Germany

[73] Assignee: Black & Decker Overseas AG, Vaduz, Liechtenstein

[21] Appl. No.: 609,131

[22] Filed: May 11, 1984

[30] Foreign Application Priority Data

May 24, 1983 [DE] Fed. Rep. of Germany ....... 3318747
Sep. 17, 1983 [DE] Fed. Rep. of Germany ....... 3333624

[51] Int. Cl.$^4$ .............................................. B27C 1/10
[52] U.S. Cl. ........................................ 30/475; 30/478; 30/481
[58] Field of Search ................ 145/4, 4.1, 4.2, 20, 145/5 B

[56] References Cited

U.S. PATENT DOCUMENTS

| 864,257 | 8/1907 | Porter | 145/4.2 |
|---|---|---|---|
| 1,243,460 | 10/1917 | Thorn . | |
| 1,393,991 | 10/1921 | Dodenhof | 145/20 |
| 1,412,609 | 4/1922 | Eger | 145/20 |
| 1,682,980 | 9/1928 | Ostertag | 145/4.2 |
| 2,615,482 | 10/1952 | Parovel | 145/4.2 |
| 2,771,105 | 11/1956 | Metoff . | |
| 2,871,897 | 2/1959 | Hesse et al. . | |
| 3,207,195 | 9/1965 | Anton . | |

FOREIGN PATENT DOCUMENTS

| 535189 | 10/1931 | Fed. Rep. of Germany . | |
|---|---|---|---|
| 1653701 | 3/1971 | Fed. Rep. of Germany . | |
| 3130686 | 6/1982 | Fed. Rep. of Germany . | |
| 3316604 | 1/1984 | Fed. Rep. of Germany . | |
| 2525948 | 4/1983 | France . | |
| 297502 | 7/1954 | Switzerland . | |
| 26875 | of 1911 | United Kingdom | 145/20 |

Primary Examiner—Frederick R. Schmidt
Assistant Examiner—J. T. Zatarga
Attorney, Agent, or Firm—Burns, Doane, Swecker & Mathis

[57] ABSTRACT

A manual planing or milling tool having a rotary driven cutter is displaceable longitudinally along a fixedly arranged guide rail. The tool is connected with a holder which carries a running part sliding on the guide rail. The holder may be guided pivotingly or nonpivotingly with respect to the guide rail. The guide rail may be fastened to a workpiece support bar rotatable by 180° so that the processing tool may be used in two different positions. The workpiece support bar may have two different surfaces, one being smooth for the working of large workpieces, while the other having grooves to receive smaller workpieces.

16 Claims, 10 Drawing Figures

GUIDE MEANS FOR MANUAL PLANING TOOLS

BACKGROUND AND OBJECTS OF THE INVENTION

The invention relates to guide means for manual or hand-held planing or milling tools with a rotary driven shaft or planer head, wherein a holder is fixedly joinable with the working tool and with a guide part.

Known manual planing tools have been used heretofore exclusively for the smooth planing of surfaces or to perform fitting work for example on window frames for wall openings or to plane doors to floor height, etc. Rabbets may also be finish-planed. The feed plate or chip thickness limiter is displaceable in parallel relationship with the guide or discharge plate. The discharge plate is generally set exactly tangent to the circle of rotation of the planing cutters and is thus not variable. Consequently, the planar structure of the workpiece to be processed remains unchanged. It is therefore not known to shape wood with manual planes to the extent required, for example, for the profiling of moldings, picture frames, contoured panelings of all types, profiled covering boards, etc.

At the present time, such work is effected essentially on large, stationary specialized milling machines, etc., which are capable only of producing commercial profiles or shaped boards, respectively. Special moldings, etc., are produced at this time, in a cumbersome manner on conventional milling machines by advancing them manually. This often requires special guide means. Certain stops fixedly joined with planing tools are known, whereby the planing tool may be guided along the longitudinal edges of the workpieces.

It is the object of the present invention to provide guide means for manual planing or milling machines having motor driven tools, permitting mobile applications, for example by craftsman, but also for do-it-yourself work in the home. This has not been possible heretofore with peripherally cutting manual tools, in particular, manual planing tools.

SUMMARY OF THE INVENTION

The invention is characterized in that a guide assembly comprises a guide rail associated with the workpiece and a running part joined with the holder and positively attached to the guide rail. Adjusting means are provided to adjust the position of the working tool with respect to the holder and of the holder with respect to the running part, respectively. The novel guide means are especially suitable for the production of moldings, lamp fixtures, radiator covers, and cover boards of all types.

A particularly simple guide device is provided by combining the profile angle, the profile depth and the cutting rate setting essentially in one guide element. This is obtained by means of a guide rail comprising a hollow, tubular round guide groove, open at a longitudinal slit to define a pivoting angle for the running part which is mounted within the groove. Alternatively, the guide rail could comprise a rod on which a sleeve-like running part is mounted.

The guide groove is more advantageous since additional surfaces which receive workpieces or fasteners are more easily applied to it. Furthermore, it is possible in a simple manner, with only two or three spherical rolling bodies fastened to an axle on the guide slide, to obtain an easy rolling and additionally adjustable longitudinal guidance. Obviously, two barrel-shaped sliding bodies may perform the same function (sliding friction).

In order to embody the necessary adjusting devices, it is especially simple to provide the holding means in the form of a holding plate, to which two parallel rods are fastened, which may be inserted into bores in the working tool, e.g., a manual planing tool, and clamped therein. This configuration permits in a very simple but stable manner the transverse displacement of the manual planing tool with respect to the holding plate, which, in turn, may be equipped with a guide aligned perpendicularly to the two rods and to the guide rail for a connecting piece to the guide element. It is convenient to have the guide comprise at least one angled edge of the holder plate, against which a guide edge of the connecting piece is abutting. It is further advantageous to provide the connecting piece itself in the form of a plate angled in the shape of a Z, the lateral edges whereof form the guiding edges and one free leg whereof is equipped with an adjusting thread for an adjusting screw mounted on the holder plate and the other free leg whereof is equipped with the guide element. This configuration thus permits the displacement in height of the holder plate with the manual planing tool in relation to the guide rail, while reset springs may be provided both for the movement of the manual planing tool on the rods with respect to the holder plate and for the displacement of the connecting piece in the holder plate.

The guide rail may be designed simply in the form of a guide groove opened on one side, made in particular of a flexible, easily rolled-up material, for example, a synethetic plastic. The running part comprises a shape adapted to the cross-section of the guide groove of the guide profile, wherein a pivoting axle is provided for the connecting piece. In this manner, the pivoting of the holder with respect to the guide rail may be assured; it may be achieved in an especially simple fashion by providing the guide profile with a guide groove having a round cross-section and designing the profile piece as a cylinder, so that the pivoting axle for the connecting piece coincides with the axle of the cylinder that may rotate in the guide profile. The guide profile has a longitudinal slit corresponding in its width to the pivoting angle of the manual plane. In order to obtain in this configuration a guidance of the manual planing tool additionally in a second plane, on the side of the manual planing tool opposite to the holder plate a sliding block, adjustable relative to the planer shaft and the planer head, may be provided in order to slide on a work or guide surface. The sliding block is supported appropriately in a pivoting and immobilizable manner on the manual planing tool in a plane perpendicular to the axle of planer head, whereby the pivoting motion of the tool resulting from the pivotability of the cylinders in the guide rail may be limited to a certain pivot angle and the depth of the working set.

In order to be able to guide the working tool in two planes, the holder assembly, in a further embodiment of the invention, may be equipped with a wheel or the like, capable of being applied against a stop surface extending parallel to the guide rail. In contrast to the first embodiment, the running part moving in the guide rail always occupies the same position with respect to said guide rail in the plane perpendicular to the direction of advance.

It is further possible to simply arrange the holder assembly displaceably with respect to the leg mounted on the running part. The rods to move the working tool with respect to the holder assembly, together with the necessary adjusting mechanism, may then be eliminated.

As the running part in the plane perpendicular to the direction of advance relative to the guide rail always occupies the same position, it is necessary in this embodiment to provide a different configuration for the pivoting of the working tool with respect to the workpiece or the workpiece support, respectively.

A particularly simple guidance in the direction of advance is obtained when the stop surface upon which the wheel attached to the holder is running, comprises a stop leg fixedly connected with the guide rail or constituting a part of the latter. Accordingly, accurate motion in the direction of advance is obtained even if the guide rail is fastened to a workpiece support that is not being worked further, when the stop leg is suitably made or processed. Preferably, the guide rail is made in a single piece with the stop leg and comprises, for example, a synthetic plastic material.

A further advantageous development of the invention may be obtained by fastening the guide rail to a workpiece support bar that is pivoting on a base on its side facing away from the guide rail around an axle located parallel to the surface of the base and at one-half of the height of the workpiece support bar and by providing stop surfaces both above and under the guide rail on the workpiece support bar. This makes it possible to rotate the workpiece support bar by 180° around the pivot axle, so that it may be placed into contact with the base with any of its surfaces parallel to the surface of said support. Conversely, any of these surfaces may be used as workpiece supports.

Prior to the turning of the workpiece support bar, the running part or parts are extracted from the guide rail and reinserted after the rotation in the opposite direction so that the working tool and the holder assembly, respectively, now also occupy a position rotated by 180° with respect to the initial position around the vertical axis. The wheel supported in the holder now is in contact with the second stop surface and runs into it. Here again, it is obviously advantageous to make the guide rail and the two stop surfaces as a single piece.

This embodiment has the advantage that two different support surfaces are available for the workpiece. It is highly advantageous and favorable in other applications also to adapt these support surfaces for use in different processing steps. An advantageous configuration provides therefore that one of the sides parallel to the base of the workpiece support bar is smooth, while the other possesses a plurality of recesses, in particular grooves, for the insertion of small or strip-like workpieces. The smooth side may be used for the working of larger workpieces, while the grooves or recesses arranged on the other side serve the insertion of smaller workpieces, which thereby are provided with additional hold and thus cannot be pulled out by the plane or milling cutter.

The rotating workpiece support bar may be placed on the support very simply by fastening an angle to the base at the end facing away from the base of which at one-half of the height of the workpiece support bar, a leg is attached rotatingly to said support bar. The fastening of the leg to the workpiece support bar may be effected in a very simple manner by providing the support bar on its side facing the leg with a recess extending over one-half of its height, the recess being large enough so that the leg is resting with one surface only against the workpiece support bar. It is then possible to attach the leg, for example, by means of a screw joint to the workpiece support bar.

To vary the position of the working tool with respect to the holder assembly, it is convenient to equip both the holder and the working tool with pivoting segments in the form of circular arcs. The pivoting segments are guided against each other, while capable of being swiveled and immobilized with respect to each other. For the immobilizing step, one of the pivoting segments may be equipped with at least one threaded bolt or the like, which is protruding through a groove of the other pivoting segment and may be immobilized by means of a clamping bolt. Depending on the size and configuration of the pivoting segments, the working tool may be brought into any angular position with respect to the surface of the workpiece support and thus the workpiece.

To adjust the position of the working tool in a plane parallel to the surface of the workpiece support, it may further be provided conveniently that the holder assembly be displaceable with respect to the guide element along an element connected with the guide element.

THE DRAWING

Further characteristics and advantages of the invention will become apparent from the description of the preferred embodiments thereof, which are illustrated by the drawing and explained in the description. In the drawing.

DETAILED DESCRIPTION OF PREFERRED EMBODIMENTS OF THE INVENTION

Figure 1:
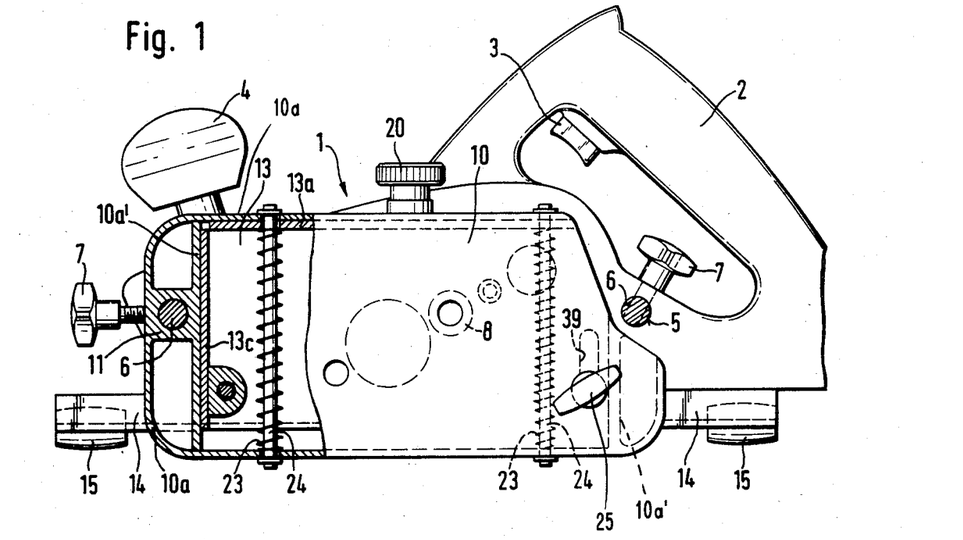
FIG. 1 is a sectional view of the novel guide device with a manual planing tool attached thereto, taken along line 1—1 of FIG. 2.
Figure 2:
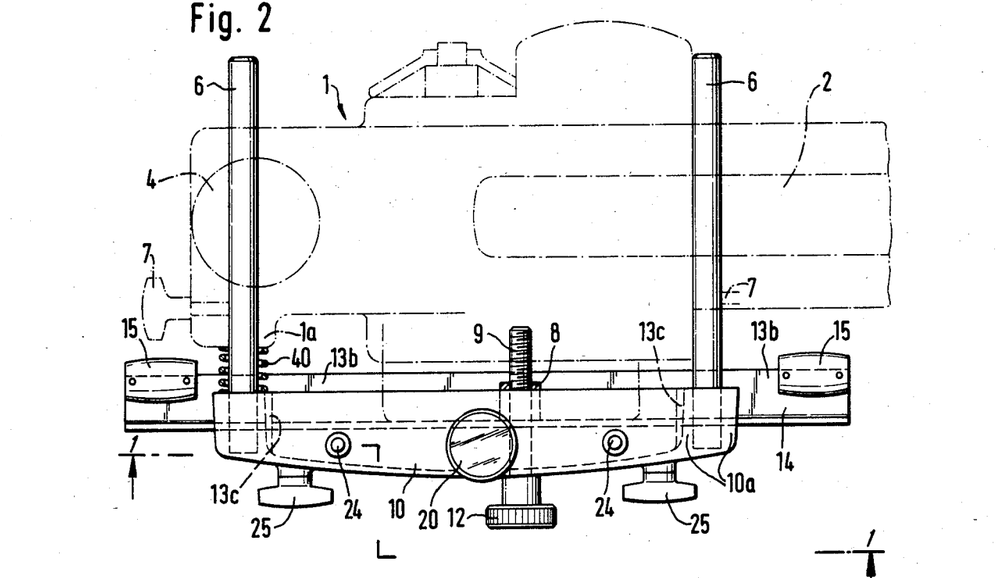
FIG. 2 is a top plan view of the guide device of FIG. 1.
Figure 3:
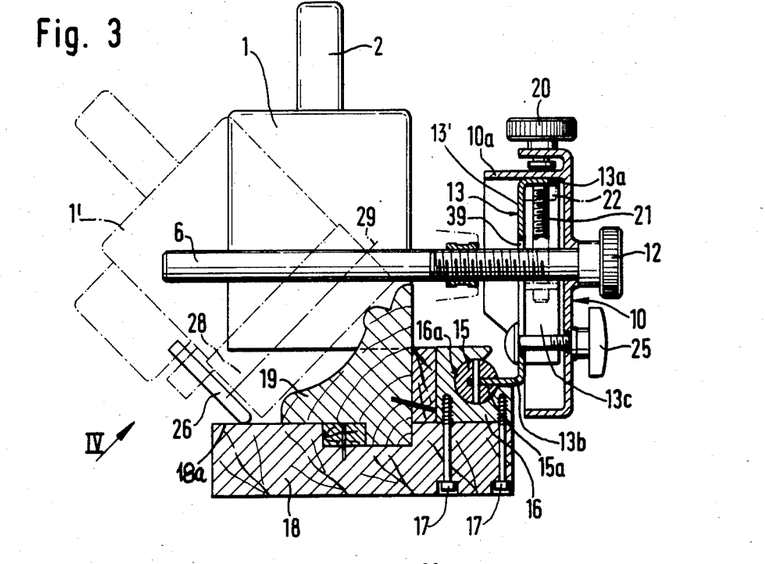
FIG. 3 is a cross-sectional view through the guide device of FIGS. 1 and 2 in the normal position (solid lines) and in a pivoted working position (broken lines)

In FIGS. 1 to 3, an electrically operated manual planing tool 1 has a manual handle 2 with an actuating switch 3 and a manual knob 4. The tool may be guided manually in a known manner to plane surfaces or the like. This manual planing tool 1 has a plurality of fastening bores 5 which pass through the planer tool 1 and are clamped onto rods 6 by means of T-screws 7. The manual planing tool 1 is further equipped with a threaded insert 8.

Both the rods 6 and the adjusting screws 9 are fastened to a holder 10, which comprises a rectangular-shaped plate of cast aluminum, which for reasons of strength and for other reasons to be set forth later, is equipped with rims 10a, 10a' extending toward the manual plane tool 1. Such a double rim structure is associated with each of the two narrow sides (i.e., the right and lefthand sides of FIG. 1) of the approximately rectangular plates, between which are arranged receiving webs 11 for the rods 6. An adjusting screw 9 is mounted rotatingly on the holder 10 and is equipped with an outwardly protruding head 12, preferably a knurled knob, so that it may be actuated manually. The screw 9 is threadedly received in the insert 8.

The left rod 6, but preferably both rods 6, are provided with a compression spring 40 confined between the holder 10 and a shoulder 1a of the manual planer tool 1. Following the release of the clamp bolts 7, the springs pressure the manual plane assembly 1 away from the holder 10 to an extent permitted by the adjusting screw 9. By actuating the adjusting screw 9, the distance between the manual plane assembly 1 and the holder 10 may therefore be adjusted in a precise manner. When this has been effected, the clamp bolts 7 are tightened so that the relative position between the manual planing tool 1 and the holder 10 is secured.

In the holder 10, a sheet metal connecting part 13 is mounted, the part 13 including an upper leg 13a and a lower leg 13b interconnected by a web 13'. The upper leg 13a (FIG. 3) lies parallel to the upper edge 10a of the plate 10 and the lower leg 13b lies parallel to the leg 13a. The legs 13a, 13b are bent so as to define a Z-shape for the part 13 in cross-section (see FIG. 3). The part 13 extends beyond the plate 10 to form a guide web 14 (FIGS. 1, 2) having the configuration of a right angle. The leg 13b has, on both sides of the plate 10, a running part in the form of guide cylinders 15 having a slight barrel-shape and attached by rivets to the web 13b. The leg 13b extends into a radial slit 15a (FIG. 3) of each cylinder 15 and is secured therein by riveting.

Figure 5:
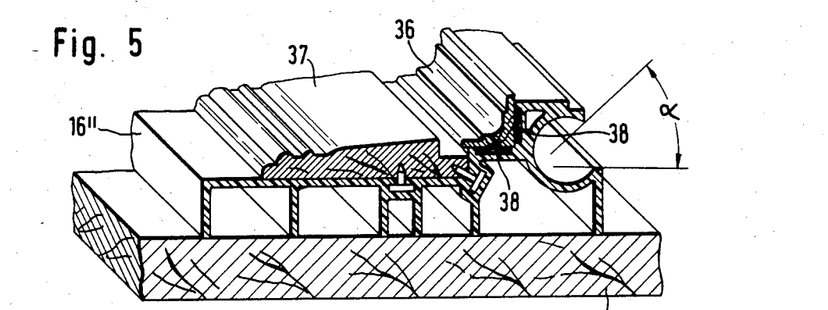
FIG. 5 is a sectioned perspective view of a modified form of guide rail which is in the form of a profiled part equipped with a stop and support surface for the workpiece to be processed.
Figure 6:
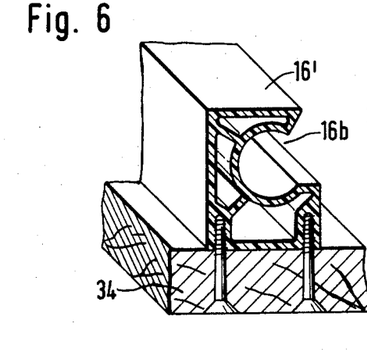
FIG. 6 is a sectioned perspective view of another embodiment of the guide rail.
Figure 7:
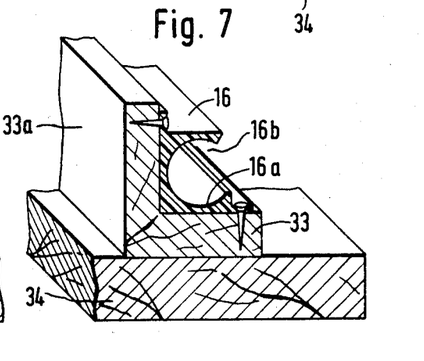
FIG. 7 is a sectional perspective view of another embodiment of the guide rail, which is applied to an angled wood strip.

The guide cylinders 15 are received, as seen in FIG. 3, in a round groove 16a of a guide rail 16, which is screwed onto a board 18 or the like by means of two rows of fastening screws 17. Further possible configurations of the guide rail 16 are illustrated in FIGS. 5 to 7.

The guide rail 16 serves to both support and align a molding 19 relative to the holder and tool (FIG. 3). The possible working and shaping of the molding 19 shall be described below.

The connecting part 13 is attached adjustably to the holder 10. For this purpose, the web 13' is oriented perpendicularly to the rods 6 and to the guide rail 16, and is displaceable in the holder 10. The part 13 includes laterally bent tabs 13c resting against the guide rims 10a' of the holder 10, which rims define a guide path for the connecting part 13. Such path is vertically oriented in FIG. 1 and extends orthogonally relative to both the rods 6 and the guide rail 16. In the holder 10, an adjusting screw 20 is located rotatingly in an upper edge of the rim 10a. The screw 20 has a thread 21 engaging a nut 22 fixedly secured to the upper leg 13a of the connecting part 13. By rotating the adjusting screw 20, relative displacement occurs between the holder 10 and the connecting part 13 in a direction orthogonal to the rail 6, with the tabs 13c sliding along the rims 10a'. The return of the connecting part 13 is effected by compression springs 23 (FIG. 1) which are mounted on two holding bolts 24 arranged parallel to the guide rims 10a' in the holder 10. Lower ends of the springs 24 bear against the lower edge of the rim 10a of the holder 10, and upper ends bear against the leg 13a of the connecting part 13. The relative position between the connecting part 13 and the holding plate 10 set by the actuation of the adjusting screw 20 is fixed by two clamping bolts 25, which protrude through longitudinal slits 39 in the web 13' of the connecting part 13.

Figure 4:
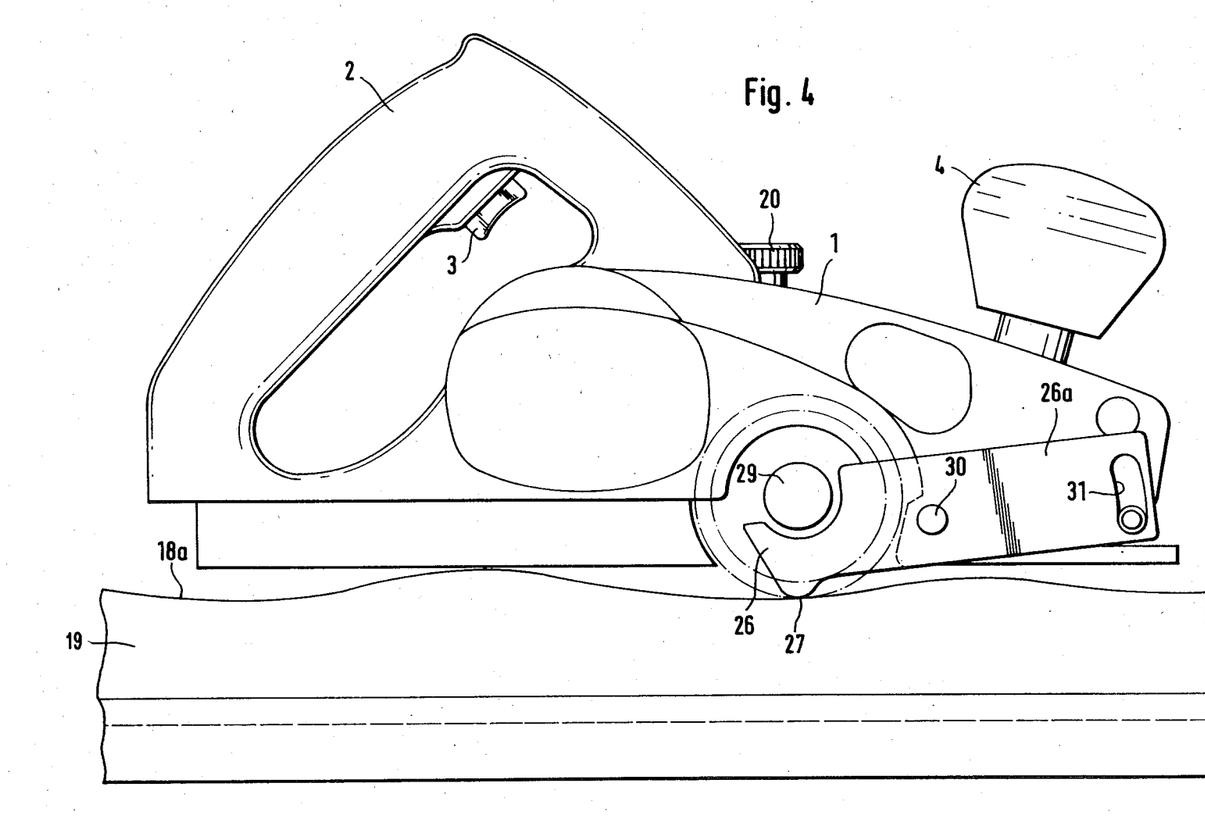
FIG. 4 is a side view of the manual plane tool as viewed in the of the arrow IV of FIG. 3.

On the side of the manual planing tool 1 (FIG. 4) facing away from the holding plate 10, a sliding block 26 is provided, the point of support 27 whereof is located in the area of the contact surface of the planer head 28 with the workpiece 19. This sliding block 26 is supported pivotingly around an axle 30 on the manual planing tool 1. The prevailing pivoting position may be fixed by means of a clamp bolt (not shown in detail) which engages, through a circular arc-shaped slit 31, a lever part 26a of the sliding block 26. The lever part 26a is located on the opposite side of the sliding block 26 in relation to the pivoting axle 30. As seen in broken lines in FIG. 3, the attack position of the planer head 28 with respect to the workpiece may be set in this manner.

The planing tool 1 with the novel guide means operates as follows. Following the fastening of the planing tool 1 to the holder 10 by means of the rods 6, the holder 10, together with the planing tool 1, is pivoted around the axis of the guide cylinder 15 into the position 1' shown by broken lines in FIG. 3. The guide rail 16 is for this purpose (as shown in particular in FIGS. 5 to 7), provided with an elongated slit of angle α, through which the leg 13b of the connecting piece 13 protrudes. The width of the elongated slit 16b is chosen so that the desired pivot angle α, e.g., 45°, may be obtained. Of course, a larger or smaller angle would also be possible.

In this pivoted condition, the position of the now-pivoted planer tool relative to the holder 10 is adjusted by the actuation of the adjusting screws 20 and 21. The sliding block 26 is similarly adjusted and subsequently all of the adjustments are fixed. It is then possible to work the surface of the workpiece 19 of FIG. 3, for example, with a profile plane along the outer contour 18a. For this purpose, the planing tool is guided along the workpiece by the presence of the guide cylinders 15 in the guide rail, the workpiece being in the form of a molding.

Of the guide rail profiles of FIGS. 5 to 7, FIG. 7 exhibits the simplest type of profile wherein a shape extruded of a synthetic plastic is nailed onto one leg of an angle strip 33, which, in turn, is fastened to a table plate 34. The other leg 33a of the angle strip may serve as a support for the workpiece to be processed which is nailed thereto in a known manner. The workpiece may also be secured by means of a so-called bur strip fastener, the components whereof are attached to the leg 33a and to the contact surface of the workpiece, respectively. The configuration has the advantage that, for example, even do-it-yourself workers are able to erect the guide unit at home at any time and produce moldings, which heretofore has not been possible. The guide rail 16 may be made, as mentioned heretofore, of a synthetic plastic material and sufficiently flexible to be rolled up and transported together with the other parts of the novel guide assembly and the planing tool.

This is also true of the profiles of the guide rail 16 shown in FIGS. 5 to 6, if they are made of a synthetic plastic. FIG. 6 shows an extruded profile that may be screwed onto the table surface 34. The guide rail 16' of this configuration needs no additional angled strip.

The profile rail 16" shown in FIG. 5 also does not require additional angle strips. It is fastened to a table surface and serves directly as the support for an angle strip workpiece 36 or a flat shape workpiece 37, which is nailed to the surface. The heads of the nails are held in corresponding elongated grooves of the guide rail 16". The shaped strip 36 is held, as indicated, by means of adhesive or bur fasteners 38 on the rail 16". This rail may be rolled up and is thus readily transported. As the remaining parts of the novel guide device may be designed in a similar light form, a portable tool is created which may be used, when equipped with planer heads carrying shape cutters, for processing work that heretofore has not been possible in this fashion.

Figure 8:
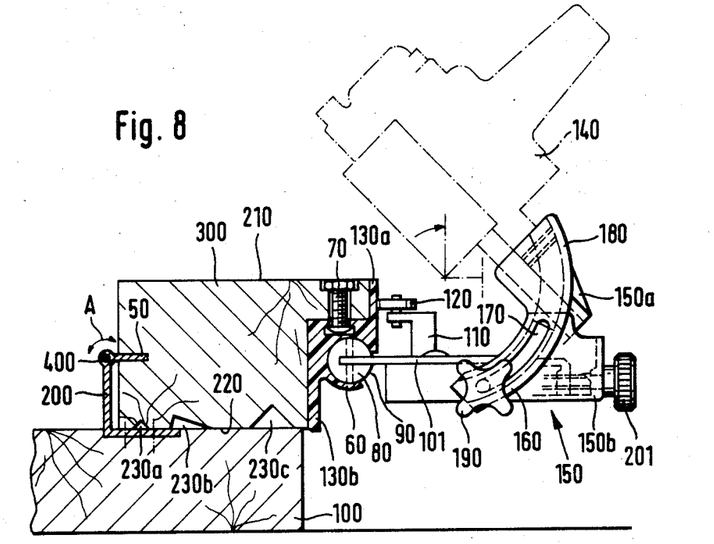
FIG. 8 is a cross-sectional view of a modified embodiment of the invention.

Another preferred embodiment of the invention is depicted in FIG. 8. To a base 100, a leg 200 in the form of an angle strip is fastened, for example by screwing. The part of this leg protruding from the base is extending to one-half the height of a workpiece support bar 300 and carries at its outer end a hinge 400, whereby a part 50 connected with the workpiece support bar 300 is rotatably supported. The workpiece support bar 300 may be pivoted around the hinge in the direction of the arrow A by 180°, whereby the advantages set forth below are achieved.

On its side facing away from the bearing 400, the workpiece support bar 300 carries a guide rail 60, which as in the examples of FIGS. 5 to 7, may consist of a synthetic plastic or a metal. In the example of embodiment of FIG. 8, it is connected with the support bar 300 by means of screws 70. The guide rail has a circular recess wherein one or several guide cylinders 80 are guided in a longitudinally displaceable manner. The advance motion proceeds in the representation of FIG. 8 from the plane of the drawing out or into it. The circular guide of the guide rail 60 has a slit 90 extending over an angle of 90°.

A plate 101 is set into the guide cylinder 80; it carries by means of a right angle member 110 a wheel 120. The wheel 120 rolls, during the advance movement, along a stop leg 130a of the guide rail 60. The guide cylinder 80 always occupies the same position relative to the guide rail in the plane perpendicular to the direction of advance. The guide rail 60, in addition, has a second leg 130b, along which the wheel 120 may roll when the support bar 300 is inverted about the hinge 400 and the processing tool is inserted in the inverse direction, as will be subsequently discussed.

The processing tool 140, which for example may consist of a manual planing or milling tool, may be pivoted with respect to a holder assembly 150. For this purpose, circular arc-shaped segments 160, 180 are mounted on first and second holder portions 150a, 150b, respectively. The holder portion 150a is connected to the processing tool 140, and the holder portion 150b is fastened to a plate 101. The pivoting segment 160 has a slit 170 in the form of a circular arc, through which a threaded bolt 190 or the like, joined to the pivoting segment 180 (indicated by broken lines) is protruding. By means of the clamp bolt 190, the position of the two pivoting segments 160, 180 with respect to each other may be immobilized. The position of the processing tool relative to the guide rail may further be adjusted to the right or left by means of a knurled adjusting screw 201. For this purpose, the screw 201 is connected with a threaded spindle and supported on the holder portion 150b in a known manner (not shown in detail). It engages an adjusting thread of the holder portion 150b. The processing tool 140 may thus be brought into any position relative to a workpiece (not shown). The workpiece is placed or clamped onto the workpiece support bar 300. The contact of the wheel 120 with the stop leg 130a provides accurate guidance and a very quiet running in the direction of advance.

Figure 9:
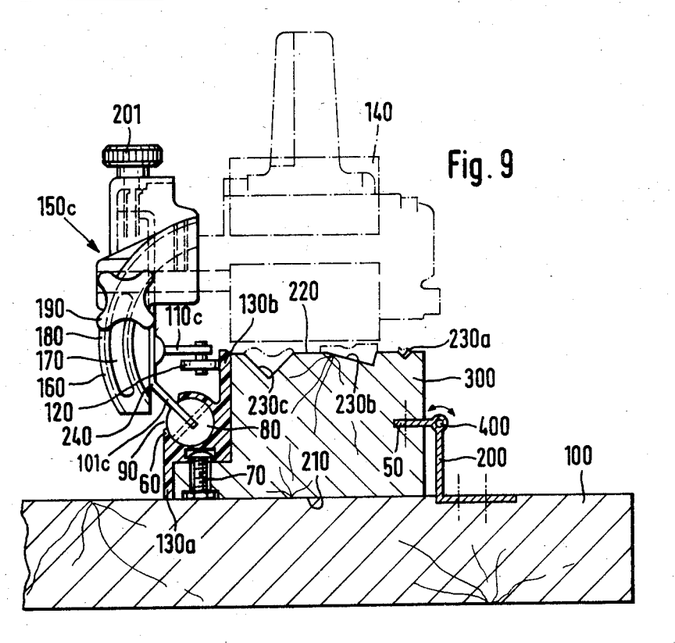
FIG. 9 is a cross-sectional view of another modified embodiment in another working position.

A further advantage of the invention is attained by the reversability of the workpiece support bar. For this, the guide cylinder 80 is extracted from the guide bar 60 and then the workpiece support bar 300 is reversed in the direction of the arrow A (FIG. 8) around its hinge 400 (FIG. 9). Subsequently, the guide cylinders 80 of a modified holder 150C are reintroduced in the reverse direction into the guide rail 60. The wheel 120 is thereby brought into contact with the stop leg 130b as noted earlier. It is thereby possible to use both surfaces of the workpiece support bar 300 for the processing of workpieces. The surface 210 is smooth and is thus suitable for working large workpieces, while the surface 220 has grooves 230a to 230c, into which smaller workpieces, for example, narrow moldings (shown in broken lines in FIG. 9) may be inserted. The processing of such pieces is much simpler as they are guided better in the groove and cannot be torn out by the plane or the milling tool.

The plate 101C depicted in FIG. 9 differs from the plate 101 of FIG. 8, in that the plate or strip shaped element 101C is bent at 240 to form an angle. The bearing support 110C for the wheel 120 is also somewhat different in FIG. 9 as compared with the support 110 of FIG. 8.

Workpiece strips are inserted into the grooves 230a to 230c and are held in said grooves, whereby their processing is simplified.

Figure 10:
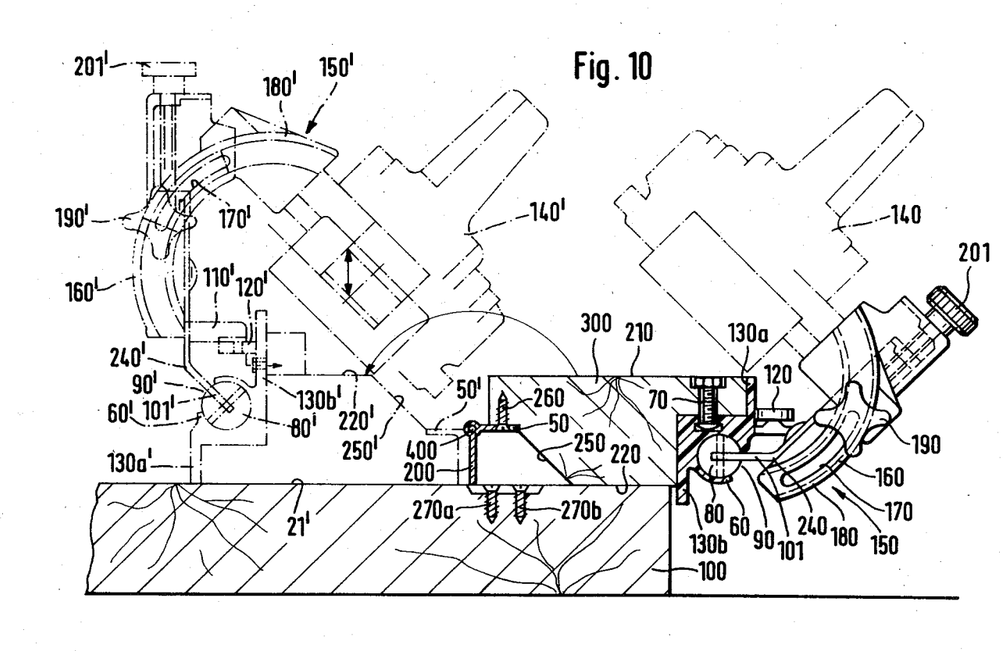
FIG. 10 a cross-sectional view of another modified embodiment, wherein the guide device, the holder assembly, and the working tool are shown in two different positions.

In FIG. 10, a further preferred embodiment of the invention is shown. The configuration of the guide rail of the holder assembly and of the processing tool essentially correspond to that of FIG. 9. The workpiece support bar 300, on the other hand, is slightly different as it has a bevel 250. This bevel has the advantage that the part 50 of the leg 200 may be screwed by means of a screw 260 directly to the support bar 300. Furthermore, FIG. 10 also shows the screw connection of the leg 200 with the base 100 by means of screws 270a and 270b. The grooves arranged on the surface 220 of the support bar 300 are not shown, but may be provided.

FIG. 10 shows the use of the workpiece support bar and the guide device in two positions. In the right-hand position, indicated by sold lines, the same reference numerals are used as in FIGS. 8 and 9. In the left-hand processing position indicated by broken lines, the reference numerals are provided with the prime sign. In this left-hand position the pivoted position 140' of the processing tool 140 is further shown, with both pivoting segments visible.

Although the present invention has been described in connection with preferred embodiments thereof, it will be appreciated by those skilled in the art that modifications, substitutions, additions, and deletions may be made without departing from the spirit and scope of the invention as defined in the appended claims.

What is claimed is:

1. An apparatus for guiding, relative to a workpiece, a hand-held planing or milling tool of the type having a rotary driven cutter, said apparatus comprising a holder for carrying the tool; first adjustment means for varying the position of the holder relative to the tool; a guide rail fixable in position relative to the workpiece; a running part carried by said holder and movably guided on said guide rail; and second adjustment means for varying the position of said running part relative to said holder, said holder including a web portion having rods projecting therefrom for connection with the tool, said holder including means forming a guide path extending orthogonally to both said guide rail and said rods; a connecting piece connected to said holder and movable adjustably within said guide path; said connecting piece carrying said running part; said holder being arranged for pivoting movement relative to said guide rail, said connecting piece comprising a metal plate including first and second legs and a portion engageable with said means forming a guide path, said second adjusting means comprising an adjusting member mounted on said holder and engageable with said first leg for adjusting the relative position of said connecting piece relative to said holder in two directions; and spring means for opposing adjustment in one of said directions; said second leg carrying said running part.

2. Apparatus according to claim 1, wherein said guide rail has a groove open to one side; said running part being shaped in cross-section similarly to the cross-section of said groove.

3. Apparatus according to claim 2, wherein said running part is of circular cross-section and is pivotably disposed within said groove which is of cylindrical cross-section; said running part being pivotable about a longitudinal axis of said groove as an axis of rotation.

4. Apparatus according to claim 3, wherein said running part comprises a plurality of generally barrel-shaped cylinders mounted on said second leg.

5. Apparatus according to claim 3 wherein said side opening of said groove defines a pivoting angle for said holder.

6. Apparatus according to claim 1, wherein said guide rail is formed of extruded aluminum and includes grooves for receiving the workpiece and for receiving a fastener for the workpiece.

7. Apparatus according to claim 5, wherein said connecting part includes a wheel for engaging a surface fixed relative to said groove and extending parallel thereto.

8. Apparatus according to claim 1, including a workpiece support bar on which said guide rail is fastened, and a base upon which said support bar is pivotably mounted on a side thereof opposite said guide rail, said support bar being pivotable relative to said base about an axis extending parallel to said guide rail.

9. Apparatus according to claim 8, including a hinge member defining said pivot axis for said support bar, said hinge member including a first part extending from said base, and a second part hinged to said first part at a distance from said base of at least one-half the thickness of said support bar, said support bar including a bevel, and said second part extending toward said bevel and fastened on one side against said support bar.

10. Apparatus according to claim 1 including a support bar to which said guide is fastened, said support bar including a surface in which a plurality of grooves are formed parallel to said guide rail, said grooves being sized to receive strip-shaped workpieces.

11. Apparatus according to claim 8, wherein one surface of said support bar is smooth and the opposite surface contains grooves extending parallel to said guide rail and sized to receive strip-shaped workpieces.

12. Apparatus according to claim 1, wherein said holder includes first and second circular segments, one said segment receiving the tool, and the other said segment carrying said running part, said segments being mutually displaceable to vary the relative positions of the tool and said running part.

13. Apparatus according to claim 1, wherein said guide rail is formed of an elastic material and is capable of being rolled-up.

14. A cutting apparatus for shaping the surface of a workpiece as an irregularly contoured surface, comprising:
    a guide rail fixed adjacent said workpiece, said guide rail including a round groove opening toward a side of said rail,
    a planing tool including a motor-driven cutter rotatable about an axis of rotation,
    a holder mounting said tool on said rail, comprising:
        a connecting piece carrying a round running part slidably mounted in said groove for sliding movement along said groove and for rotational movement about a longitudinal axis of said groove,
        a web mounted on said connecting piece and including a plurality of carrier rods projecting from said web in a direction parallel to said axis of rotation, said tool being carried by said rods,
        first adjusting means for adjusting said tool toward and away from said holder in a direction parallel to said axis of rotation, and
        second adjusting means for adjusting said web relative to said connecting piece in a direction toward and away from said rail.

15. Apparatus according to claim 14 including spring means on at least one of said rods for biasing said holder away from the tool, said first adjusting means comprising an adjusting screw mounted on said holder and connectible with the tool for regulating the spacing therebetween.

16. Apparatus according to claim 14, wherein said connecting piece comprises a metal plate; said connecting piece including first and second legs and a portion engageable with said means forming a guide path, said second adjusting means comprising an adjusting member mounted on said holder and engageable with said first leg for adjusting the relative position of said connecting piece relative to said holder in two directions; and spring means for opposing adjustment in one of said directions; and said leg carrying said running part.

* * * * *